(12) United States Patent
Williams

(10) Patent No.: US 12,744,683 B1
(45) Date of Patent: Sep. 22, 2026

(54) SYSTEMS AND METHODS FOR ENHANCED NON-FUNGIBLE TOKEN EVENTS

(71) Applicant: State Farm Mutual Automobile Insurance Company, Bloomington, IL (US)

(72) Inventor: Aaron Williams, Congerville, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 110 days.

(21) Appl. No.: 18/334,094

(22) Filed: Jun. 13, 2023

Related U.S. Application Data

(60) Provisional application No. 63/394,508, filed on Aug. 2, 2022.

(51) Int. Cl.
*H04L 9/00* (2022.01)
*H04L 9/32* (2006.01)

(52) U.S. Cl.
CPC .............. *H04L 9/50* (2022.05); *H04L 9/3236* (2013.01)

(58) Field of Classification Search
CPC ................................ H04L 9/50; H04L 9/3236
See application file for complete search history.

(56) References Cited

U.S. PATENT DOCUMENTS 12,380,432 B1 * 8/2025 Chan .................... G06Q 20/389
2011/0035187 A1 * 2/2011 Dejori ................ G06F 9/44526 702/187
2018/0316633 A1 * 11/2018 Mo ........................ H04L 51/216
2021/0279305 A1 * 9/2021 Goldston ................ G06F 16/41
2023/0139878 A1 * 5/2023 Clark .................... H04L 9/3297 713/157
2023/0176805 A1 * 6/2023 Dudovitch ............ A63F 13/847 715/757
2023/0252088 A1 * 8/2023 Porter .................. H04L 9/3239 715/234
2023/0396610 A1 * 12/2023 Berry ................. H04L 63/0853

* cited by examiner

*Primary Examiner* — Sm A Rahman
(74) *Attorney, Agent, or Firm* — Armstrong Teasdale LLP

(57) ABSTRACT

A computer system for archiving and analyzing events is provided. The computer system may include at least one processor in communication with at least one memory device. The at least one processor may be programmed to (i) receive a plurality of data for an event; (ii) generate a container file for the event to include the plurality of data; (iii) generate a non-fungible token (NFT) for the event; and/or (iv) store the NFT and the container file of the event.

19 Claims, 6 Drawing Sheets

6/6

SYSTEMS AND METHODS FOR ENHANCED NON-FUNGIBLE TOKEN EVENTS

CROSS-REFERENCE TO RELATED APPLICATIONS

This application claims priority to U.S. Provisional Patent Application Ser. No. 63/394,508, filed Aug. 2, 2022, the entire contents and disclosure of which are hereby incorporated herein by reference in its entirety.

FIELD OF THE DISCLOSURE

The present disclosure relates to enhanced non-fungible token (NFT) events and, more particularly, to a network-based system and method for generating non-fungible tokens (NFTs) to recreate an event including sensor data for the event.

BACKGROUND

When an event happens, there is a lot of data that needs to be analyzed. However, in many cases, the data comes from a plurality of sources, and may be stored in a plurality of storage locations and storage types. Furthermore, in some cases, the data may not be secured against changes. When the event is to be analyzed, the data needs to be collected together in one location.

Many of the current systems make it difficult to ensure that the data is correct and has not been analyzed. Conventional techniques may also make it more difficult to determine if all of the needed data has been provided when analysis is ready to occur. In some of these cases, it may take a couple of days to a couple of weeks to collect all of the data to be analyzed. During this time, data may be lost and/or misplaced. Conventional techniques may also be ineffective, inefficient, cumbersome, and/or have other drawbacks as well.

BRIEF SUMMARY

The present embodiments may relate to systems and methods for providing enhanced personal property archival and retrieval. The systems and methods may securely collect and store event information, and provide access to that information as needed. A personal property archival system, as described herein, may include an Event Archive and Analysis ("EAA") computer device that is in communication with a user computer device and a plurality of sensors. The EAA computer device may be configured to (i) receive a plurality of data for an event; (2) generate a container file for the event to include the plurality of data; (3) generate a non-fungible token (NFT) for the event; and/or (4) store the NFT and the container file of the event.

In one aspect, a computer system for archiving and analyzing events may be provided. The computer system may include at least one processor (and/or associated transceiver) in communication with at least one memory device. The computer system may also be configured to include or interact with one or more local or remote processors, servers, sensors, transceivers, virtual headsets or glasses (e.g., virtual reality (VR) headsets, smart glasses or contacts, augmented reality (AR) glasses or headsets, or extended reality (XR) headsets), memory units, and/or other electronic or electrical components. In one instance, the at least one processor may be configured or programmed to: (1) receive a plurality of data for an event; (2) generate a container file for the event to include the plurality of data; (3) generate a non-fungible token (NFT) for the event; and/or (4) store the NFT and the container file of the event. The computer system may have additional, less, or alternate functionality, including that discussed elsewhere herein.

In another aspect, a computer-based method for archiving and analyzing events may be provided. The method may be implemented via one or more local or remote processors, servers, sensors, transceivers, virtual headsets or glasses (e.g., virtual reality (VR) headsets, smart glasses or contacts, augmented reality (AR) glasses or headsets, or extended reality (XR) headsets), memory units, and/or other electronic or electrical components. In one instance, the method may be implemented on an Event Archive and Analysis ("EAA") server that includes at least one processor (and/or associated transceiver) in communication with at least one memory device. The method may include, via the at least one processor: (1) receiving a plurality of data for an event; (2) generating a container file for the event to include the plurality of data; (3) generating a non-fungible token (NFT) for the event; and/or (4) storing the NFT and the container file of the event. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) receive a plurality of data for an event; (2) generate a container file for the event to include the plurality of data; (3) generate a non-fungible token (NFT) for the event; and/or (4) store the NFT and the container file of the event. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
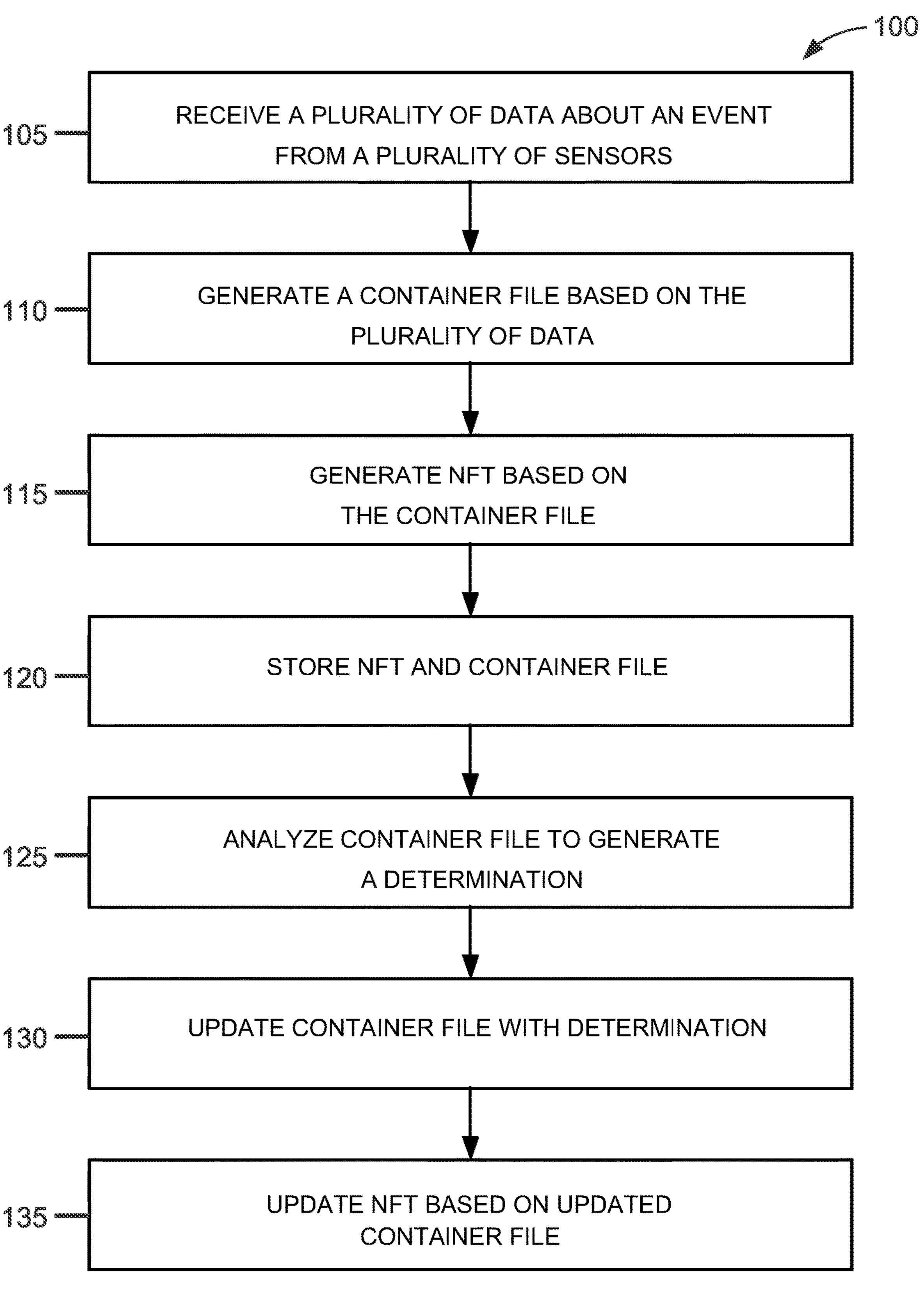
FIG. 1 illustrates a flow chart of an exemplary process for processing and archiving data about an event into a digital environment in accordance with one embodiment of this disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for enhanced non-fungible token events and, more particularly, to a network-based system and method for generating non-fungible tokens (NFTs) to recreate an event including sensor data for the event. An event archive and analysis system, as described herein, may include an Event Archive and Analysis ("EAA") computer device that is in communication with a user computer device, a plurality of sensors, and one or more third party servers. In an exemplary embodiment, the process is performed by the Event Archive and Analysis ("EAA") computer device, also known as an Event Archive and Analysis ("EAA") server.

In the exemplary embodiment, a user, such as a policyholder, works with an insurance provider or other entity associated with a policy. The plurality of sensors provide sensor information to the EAA computer device about an event. In some embodiments, the sensor information is provided after the event. In other embodiments, the sensor information is provided continuously and the EAA computer device determines when an event happened. The EAA computer device stores the sensor information about the event. This may include sensor information from before, during, and after the event. The EAA computer device stores the sensor information in an NFT container to securely contain the information. The EAA computer device allows access to the NFT based on the ownership of the NFT. The sensor information may then be used to recreate and analyze the event. In some embodiments, the EAA computer device also stores a plurality of additional information from other sources, including third party sources. This additional information is also stored in the NFT, and may also be analyzed as a part of the event.

For instance, a user may be driving a vehicle and then be a part of a collision of multiple vehicles. The user's vehicle may provide its the sensor information to the EAA computer device. The user may also use a user computer device to provide information about the accident. In addition, sensors and/or other third party computer devices may provide additional information about the accident, such as, but not limited to, sensor information from the other vehicles in the collision, sensor information from other vehicles in the area of the collision, insurance reports about the collision, cellphone footage (other recordings) of the collision and/or the aftermath, police reports about the collision, emergency responder reports about the collision, and/or other sources of information.

The EAA computer device stores the provided information in an NFT associated with the collision. In some embodiments, the ownership of the NFT is transferred between departments as the event (collision) is reported and analyzed to different departments and/or individuals. In the exemplary embodiment, a non-fungible token (NFT) may be generated to log the ownership of the report and/or analysis.

In the exemplary embodiment, the information may be analyzed by one or more artificial intelligence (AI), or machine learning (ML) trained models. The EAA computer device executes the model (or models) to analyze the data about the collision to determine if all of the needed data is available. If some of the data is unavailable, the EAA computer device attempts to recreate the needed data based on the currently available data. If the needed data is still unavailable, then the EAA computer device requests the needed data, such as from a user computer device or other system. If the needed data is available, the EAA computer device executes the model to recreate and analyze the collision. Then the EAA computer device generates a final report. In some insurance based embodiments, the EAA computer device reacts to a claim that was made associated with the collision and generates claim findings. In the exemplary embodiment, the EAA computer device provides the final report and/or claim to one or more user computer devices for review.

As used herein, an NFT (non-fungible token) is a digital asset that represents another object, such as, but not limited to, a real-world object and/or a digital object. The NFT may be generally stored in a blockchain or other cryptographic ledger or register. The NFT may include, but is not limited to, ownership information and a link to a digital asset file that describes, points to, or otherwise indicates a real-world or digital object. NFTs may be traded, sold, exchanged, or otherwise change ownership. The ownership change may be stored on the corresponding blockchain, ledger, and/or register.

A blockchain is a distributed database that maintains a continuously-growing list of ordered records, known as blocks. Each block may contain at least a timestamp and a link to the previous block in the chain. The link to the previous block may be a hash of the previous block. For an insurance contract, the first block may contain the initial contract between a driver and an insurer. The second block may contain a modification to the contract that was requested by the driver and approved by the insurer. The second block may contain a hashed copy of the first block as well. The third block may contain one or more additional terms for the insurance contract and a hashed copy of the second block. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

In the exemplary embodiment, the EAA computer device is in communication with one or more storage hubs or databanks, that are databases of rules, past events, and other data that allows the EAA computer device to perform the methods described herein. The EAA computer device is able to determine what happened at the event associated with an individual policyholder and/or individual policy. The EAA computer device generates a report of the event and/or responses to one or more claims.

In some further embodiments, the EAA computer device monitors negotiations with third parties. For example, if the event was a collision between two vehicles covered by different insurance providers, then a negotiation would take place between the two insurance providers to determine who would pay what for the collision. In these embodiments, the EAA computer device monitors a plurality of negotiations between the two insurance providers and generates a model of the negotiations. The EAA computer device may then use that negotiation model to predict how much the other insurance provider will provide for this collision.

In some further embodiments, the EAA computer device may adjust one or more details of the final report to affect the amounts from each insurance provider. For example, the EAA computer device determines that insurance provider B will pay a higher percentage of the claim if certain information is provided earlier in the report, such as in the executive summary. In another example, the EAA computer device determines that insurance provider B will argue more if one or more graphs and/or analyses are not provided in the final report. The EAA computer device will then cause those graphs and/or analyses to be added to all future reports that will be sent to insurance provider B.

At some point an event occurs that causes a loss for the policyholder or other user. This event could be any event that results in a loss for the policyholder that causes the policyholder to submit a claim. For example, the event may be a fire or storm damage to the policyholder's house or a vehicular accident, or any other type of loss. In another example, the loss could be a partial loss. For example, either where the policyholder's home is only partially damaged, or where the policyholder's vehicle was broken into, and several items were taken out of the vehicle.

When a claim is initially processed, the EAA server may retrieve information stored in the NFT associated with the user. In some embodiments, the information may include sensor information from the user's house (smart home devices and/or Wi-Fi reports), the user's vehicle (telematics data), and the user's mobile device (cell-phone, laptops, tablets, virtual headset, etc.). For instance, the user may generate or collect data using various sensors, mobile devices, smart glasses or virtual headsets (such as VR, XR, or AR headsets or glasses), smart contacts, smart watches, wearables, cameras, vehicle or home mounted sensors/cameras, etc. The EAA server may also receive, but is not limited to, eyewitness reports, police reports, emergency responder reports, smart infrastructure, user information, third party reports or mobile devices, video, audio, images, and/or any other information needed for analysis of the claim.

In some embodiments, the EAA server receives a plurality of information for the claim and stores that information in an NFT associated with the event. In some embodiments, the EAA server generates an NFT for the event when the claim is received. In other embodiments, the EAA server detects an event, such as a collision, and automatically creates an NFT for that event.

In at least one embodiment, the NFT entry on the blockchain includes the location of the NFT and a hash of the NFT. This hash allows the EAA server and/or any users to ensure that the NFT has not been modified. In these embodiments, when data is added to the NFT, then the NFT is re-hashed, and that hash is provided in a new block on the blockchain. For example, the EAA server may receive a report from a third party server about the event. The EAA server retrieves the location of the NFT and the hash for the NFT from the blockchain. The EAA server compares the hash to the NFT to validate the NFT. In at least one embodiment, the EAA server hashes the NFT and compares that hash to the stored hash. If they match, then the NFT is validated. The EAA server modifies the NFT to include the report and then creates a hash of the NFT including the report. The new hash is reported to and stored in a new block on the blockchain.

At least one of the technical problems addressed by this system may include: (i) improving speed and efficiency of processing an insurance claim; (ii) improving accuracy and reducing fraud (or buildup) on insurance claims; (iii) ensuring the integrity of data about an event; (iv) saving accurate records; (v) consistently analyzing events to provide consistent results; and (vi) allowing multiple users to interact with the data while preserving the data integrity.

The methods and systems described herein may be implemented (i) using computer programming or engineering techniques including computer software, firmware, hardware, or any combination or subset thereof, and/or (ii) by using one or more local or remote processors, transceivers, servers, sensors, servers, scanners, AR or VR headsets or glasses, smart glasses, and/or other electrical or electronic components, wherein the technical effects may be achieved by performing at least one of the following steps: 1) receive a plurality of data for an event; (2) generate a container file for the event to include the plurality of data; (3) generate a non-fungible token (NFT) for the event; and/or (4) store the NFT and the container file of the event.

Exemplary Process for Event Processing and Archiving

FIG. 1 illustrates a flow chart of an exemplary process 100 for processing and archiving data about an event into a digital environment in accordance with one embodiment of this disclosure.

Figure 2:
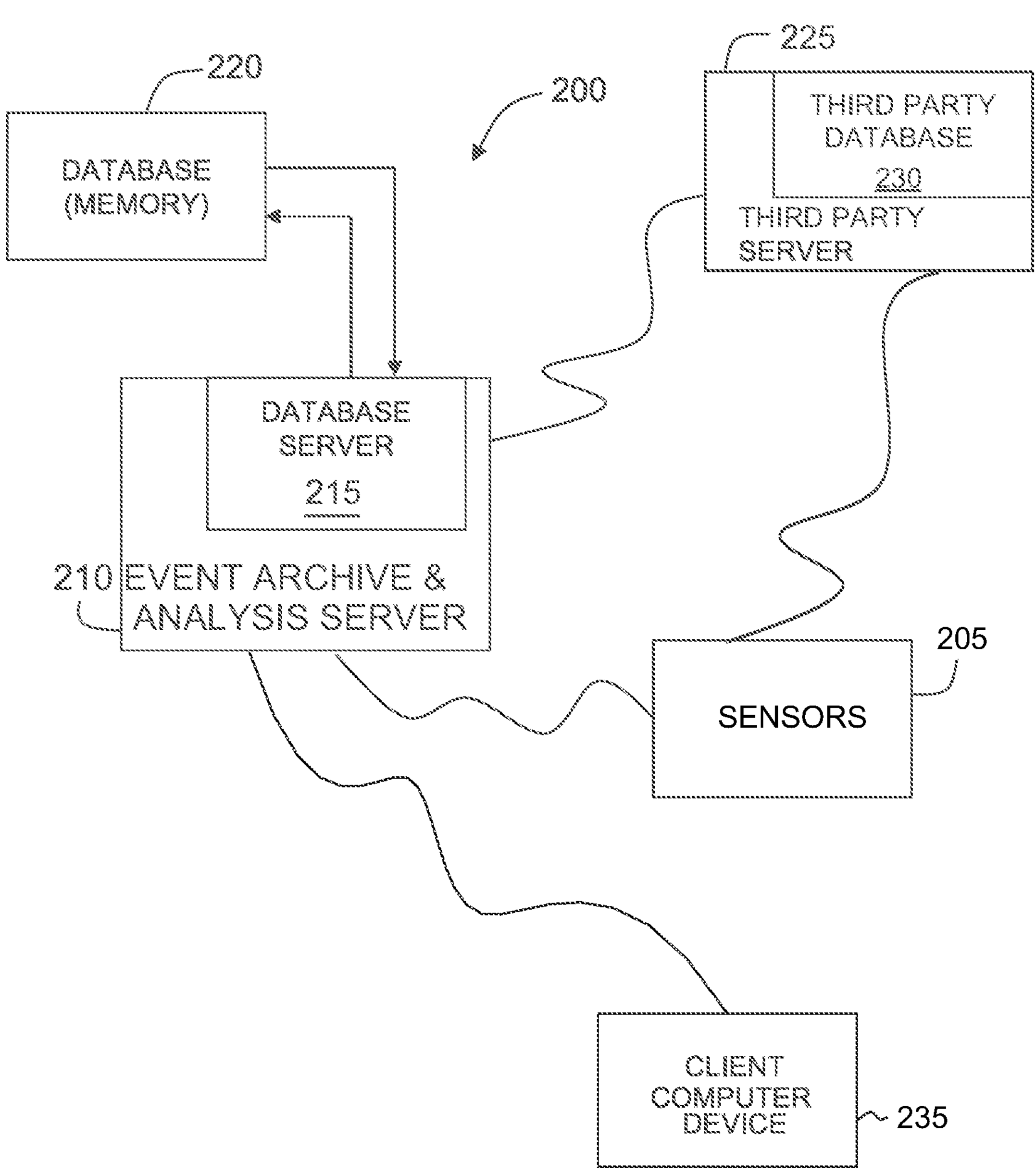
FIG. 2 illustrates a simplified block diagram of an exemplary computer system for implementing the process shown in FIG. 1.

In the exemplary embodiment, process 100 may be performed by an Event Archive and Analysis ("EAA") computer device, also known as an Event Archive and Analysis ("EAA") server 210 (shown in FIG. 2). In the exemplary embodiment, the EAA computer device 210 receives 105 a plurality of data about an event from a plurality of sensors 205 (shown in FIG. 2). The sensors 205 may include, but are not limited to, vehicle sensors, home sensors, infrastructure sensors, sensors in one or more mobile devices, and/or any other type of sensor that may be used to analyze an event.

Vehicle-based sensors may include navigation, communications, safety, security, and/or "infotainment" data. For example, vehicle telematics data collected may include, but is not limited to braking and/or acceleration data, navigation data, vehicle settings (e.g., seat position, mirror position, temperature, or air control settings, etc.), remote-unlock and/or remote-start data (e.g., determining which user computer device is used to unlock or start vehicle) and/or any other telematics data. The plurality of sensors 205 may also include sensors that detect conditions of vehicle, such as covered distance, speed, acceleration, gear, braking, cornering, and other conditions related to the operation of vehicle, for example: at least one of a measurement of at least one of speed, direction rate of acceleration, rate of deceleration, location, position, orientation, cornering, and rotation of the vehicle, and a measurement of one or more changes to at least one of speed, direction rate of acceleration, rate of deceleration, location, position, orientation, and rotation of the vehicle. Furthermore, plurality of sensors 205 may include impact sensors that detect impacts to vehicle, including force and direction and sensors that detect actions of vehicle, such the deployment of airbags. In some embodiments, plurality of sensors 205 may detect the presence of driver and one or more passengers (not shown) in vehicle. In these embodiments, plurality of sensors 205 may detect the presence of fastened seatbelts, the weight in each seat in vehicle, heat signatures, or any other method of detecting information about driver and/or passengers in vehicle.

In the case of property, such as, but not limited to, a home and/or a business property, the plurality of sensors 205 may be deployed (and/or embedded) throughout property. The sensors 205 may include, broadly, any kind of sensor (e.g., temperature, motion, sound/audio signal, light, etc.). However, in some embodiments, the sensors 205 specifically include a smart thermostat.

Sensors 205 may also include a home security system which may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the structure on the property, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that may detect potential contemporaneous risks to the property or its occupants (e.g., intrusion, fire, health).

Additionally, the EAA server 210 may determine which components where connected to the smart home system, such as, but not limited to, smart locks, smart furnaces, smart air conditioners, smart thermostats, smart light bulbs, smart sensors, smart valves, smart appliances, smart sprinklers, smart lighting systems, smart electronics, smart electrical components, and any other device or processor run through the smart home device, such as through a smart home hub.

In one embodiment, an individual, such as a policyholder or other user, has decided to file a claim for an event, such as, but not limited to, a house fire, a house robbery, a vehicle collision, a vehicle robbery, and/or any other claim situation. In other embodiments, the EAA computer device 210 detects an event based on the received plurality of data. The received information may be about information about the devices connected to the Wi-Fi network at the policyholder's property. The EAA server 210 may receive message traffic data, log data, or other data that allows EAA server 210 to identify the devices that connected to the policyholder's network. These devices may include laptops, desktops, tablets, smartphones, virtual headsets, smart glasses, mobile devices, IP cameras, smart refrigerators, smart stoves, and other wireless connected devices or mobile devices. The EAA server 210 may be able to determine a make and model associated with each electronic device that is connected to the network.

In at least one embodiment, in addition to the plurality of sensor data, the EAA computer device 210 receives additional data, such as, but not limited to, eyewitness reports, police reports, emergency responder reports, user information, third party reports, video, audio, images, and/or any other information needed for analysis of the event.

In the exemplary embodiment, the EAA server 210 generates 110 a container file based on the plurality of data. Then the EAA server 210 generates 115 an NFT (non-fungible token) based on the container file. The NFT may include information identifying the container file, a validation hash of the container file, and the ownership of the container file. If the ownership of the event changes, such as by the insurance policy changing hands, then the NFT may be updated with that information.

The EAA server 210 may store 120 the NFT and the container file. In the exemplary embodiment, the NFT may be stored on a blockchain, while the container file may be stored in a database, such as database 220 (shown in FIG. 2). The NFT may include a pointer to where the container file is currently stored. The NFT's pointers may be updated when the location of the container file is changed.

In at least one embodiment, the NFT may include a link to where the container file is stored and a hash of the container file. The EAA server 210 executes a hash function, such as, but not limited to, SHA-256 and SHA-512, on the container file. When the EAA server 210 goes to retrieve the container file, the EAA server 210 may use the stored hash to validate the container file. If anything has changed in the container file since the NFT was updated, then the stored hash will not match the current hash of the container file. In some of these embodiments, when the EAA server 210 updates the container file, such as with additional information and/or sensor data, the EAA server 210 stores the hash of the updated container file in the NFT. In some embodiments, the EAA server 210 stores 120 a new copy of the container file every time the container file is updated. The EAA server 210 may also store a link to the updated container file in the NFT.

In the exemplary embodiment, the EAA server 210 may analyze 125 the container file to generate a determination about the event. In the insurance-based embodiment, the determination may be whether or not to pay a claim, and/or how much to pay on a claim. In other embodiments, the determination may be a report on what happened during the event, or virtual reconstruction of one or more events (or a series of sub-events constituting a cause of loss or other insurance-related event). In still further embodiments, the determination may be that additional information is required to be able to complete the analysis of the event. In these embodiments, the EAA server 210 may determine which data is needed, and request the needed data.

In the exemplary embodiment, the EAA server 210 may update 130 the container file with the determination. The EAA server 210 may then update 135 the NFT based on the updated container file.

In some embodiments, the EAA server 210 may use artificial intelligence (AI) and/or machine learning (ML) to make the determination about the event. In these embodiments, the EAA server 210 may have access to a plurality of historical events and their corresponding data. The EAA server 210 may then generate a model of events to determine predicted outcomes, where these predicted outcomes are generated by the model of events using the received sensor information as inputs. In these embodiments, the EAA server 210 may use the sensor information and outcomes of the current event to update the model.

In some further embodiments, the EAA server 210 may use the sensor data to predict an event, or prepare for a predicted event. For example, the EAA server 210 may detect reckless driving and save sensor data in case a collision occurs. In other embodiments, the EAA server 210 may detect dangerous weather conditions, and collect sensor information in case those conditions may lead to a claim.

In some embodiments, the EAA server 210 may validate the information as it comes from the sensors 205, such as through a unique identifier or other validation method. Furthermore, the EAA server 210 may validate the information that comes from the third-party server 225 (shown in FIG. 2). The process 100 may include additional, less, or alternate actions, including those discussed elsewhere herein.

Exemplary Computer Network

FIG. 2 depicts a simplified block diagram of an exemplary computer system 200 for implementing process 100 shown in FIG. 1. In the exemplary embodiment, system 200 may be used for archiving and viewing digital objects, such as digital twins. As described below in more detail, an Event Archive and Analysis ("EAA") server 210 may be configured to (1) receive a plurality of data for an event; (2) generate a container file for the event to include the plurality of data; (3) generate a non-fungible token (NFT) for the event; and/or (4) store the NFT and the container file of the event.

Sensors 205 are devices capable of sensing attributes of their environment. Sensors 205 may be a part of a vehicle, home, building, mobile device, virtual headset, and/or any other object that the sensors 205 may then provide the attributes of the environment. For instance, the sensors 205 may generate and collect data from several of the user's devices, such as the user's autonomous vehicle(s), smart vehicle, smart home controller, smart security systems, mobile devices, wearables, virtual headsets or smart glasses, family member devices, etc.

For instance, vehicle-based sensors may include navigation, communications, safety, security, and/or "infotainment" data. For example, vehicle telematics data collected may include, but is not limited to braking and/or acceleration data, navigation data, vehicle settings (e.g., seat position, mirror position, temperature, or air control settings, etc.), remote-unlock and/or remote-start data (e.g., determining which user computer device is used to unlock or start vehicle) and/or any other telematics data. The plurality of sensors 205 may also include sensors that detect conditions of vehicle, such as covered distance, speed, acceleration, gear, braking, cornering, and other conditions related to the operation of vehicle, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 205 may include impact sensors that detect impacts to vehicle, including force and direction and sensors that detect actions of vehicle, such the deployment of airbags.

In some embodiments, plurality of sensors 205 may detect the presence of driver and one or more passengers (not shown) in vehicle. In these embodiments, plurality of sensors 205 may detect the presence of fastened seatbelts, the weight in each seat in vehicle, heat signatures, or any other method of detecting information about driver and/or passengers in vehicle.

In the case of property, such as, but not limited to, a home and/or a business property, the plurality of sensors 205 may be deployed (and/or embedded) throughout property. The sensors 205 may include, broadly, any kind of sensor (e.g., temperature, motion, sound/audio signal, light, etc.). However, in some embodiments, the sensors 205 specifically include a smart thermostat.

Sensors 205 may also include a home security system which may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the structure on the property, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that may detect potential contemporaneous risks to the property or its occupants (e.g., intrusion, fire, health).

In the exemplary embodiment, sensors 205 are enabled to transmit sensor data to the EAA servers 210 using the Internet. More specifically, the sensors 205 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In some embodiments, sensors 205 may be associated with any device capable of accessing the Internet including, but not limited to, a mobile device, a desktop computer, a laptop computer, a personal digital assistant (PDA), a cellular phone, a smartphone, a tablet, a phablet, wearable electronics, smart watch, chat bots, or other web-based connectable equipment or mobile devices EAA server 210 may be communicatively coupled with one or more the client computer devices 235. In some embodiments, EAA server 210 may be associated with, or is part of a computer network associated with an insurance provider, or in communication with the insurance provider's computer network (not shown). In other embodiments, EAA server 210 may be associated with a third party and is merely in communication with the insurance provider's computer network.

In the exemplary embodiment, EAA server 210 includes one or more computers that include a web browser or a software application, which enables EAA servers 210 to receive data from the sensors 205 using the Internet. More specifically, EAA servers 210 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. EAA servers 210 may be any device capable of accessing the Internet including, but not limited to, a mobile device, a desktop computer, a laptop computer, a personal digital assistant (PDA), a cellular phone, a smartphone, a tablet, a phablet, wearable electronics, virtual headset, smart glasses, smart watch, chat bots, or other web-based connectable equipment or mobile devices.

A database server 215 may be communicatively coupled to a database 220 that stores data. In one embodiment, database 220 may include sensor data, container files, NFTs, blockchains, ownership information, claims received from the policyholder, and/or preferences provided by the policyholder. In the exemplary embodiment, database 220 may be stored remotely from EAA server 210. In some embodiments, database 220 may be decentralized. In the exemplary embodiment, a person may access database 220 via client computer devices 235 by logging onto EAA server 210, as described herein.

One or more third-party servers 225 may be communicatively coupled with EAA server 210. The one or more third-party servers 225 each may be associated with a third-party database 230. Third-party servers 225 may provide additional information to the EAA server 210. For example, third-party servers 225 may be associated with a different insurance provider. Third-party servers 225 may also be associated with other providers of information, such as, but not limited to, police departments, emergency medical providers, hospitals, and/or other third-parties. In the exemplary embodiment, third-party servers 225 are computers that include a web browser or a software application, which enables third-party servers 225 to access EAA server 210 using the Internet. More specifically, third-party servers 225 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Third-party servers 225 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, chat bots, or other web-based connectable equipment or mobile devices.

In the exemplary embodiment, client computer devices 235 are computers that include a web browser or a software application, which enables client computer devices 235 to access EAA server 210 using the Internet. More specifically, client computer devices 235 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computer devices 235 may be any device capable of accessing the Internet including, but not limited to, a mobile device, a desktop computer, a laptop computer, a personal digital assistant (PDA), a cellular phone, a smartphone, a tablet, a phablet, wearable electronics, smart glasses, virtual headsets, smart watch, chat bots, or other web-based connectable equipment or mobile devices. In some embodiments, client computer devices 235 are capable of accessing information from or providing information to the container files.

Figure 3:
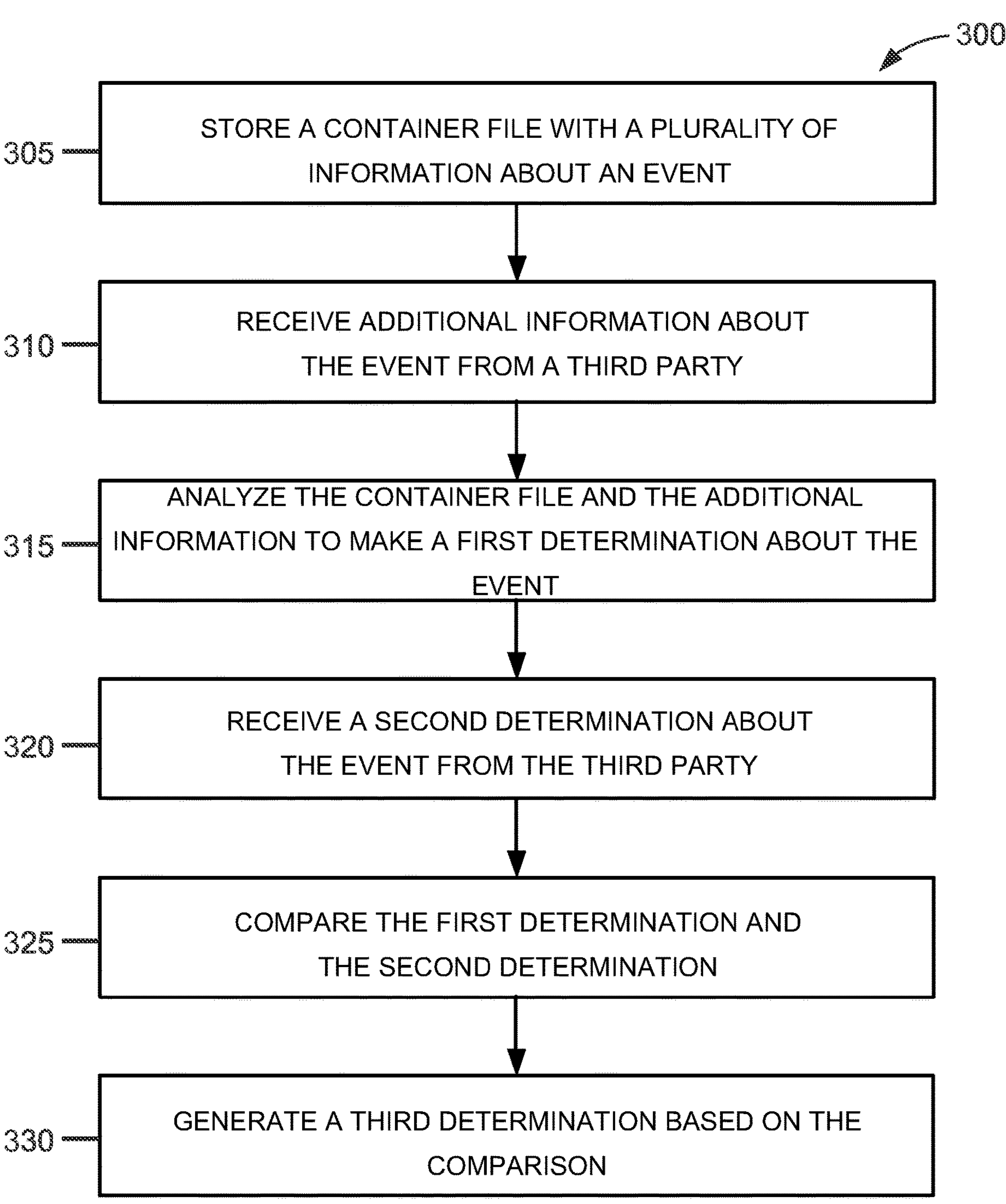
FIG. 3 illustrates a flow chart of an exemplary computer-implemented process for analyzing an event using the system shown in FIG. 2.

Exemplary Computer-Implemented Method for Processing Personal Property Replacement Claims FIG. 3 illustrates a flow chart of an exemplary computer-implemented process 300 for analyzing an event using the system 200 (shown in FIG. 2).

Process 300 may be implemented by a computing device, for example EAA server 210 (shown in FIG. 2). In the exemplary embodiment, EAA server 210 may be in communication with one or more third-party servers 225 and one or more client computer devices 235 (both shown in FIG. 2). In some embodiments, process 300 may occur after process 100 (shown in FIG. 1). In other embodiments, process 300 may occur any time after Step 120 (shown in FIG. 1).

In the exemplary embodiment, the EAA server 210 stores 305 a container file with a plurality of information about an event. In the exemplary embodiment, the container file is associated with an NFT, where the NFT includes a link to the container file and a hash of the container file. In at least one embodiment, Step 305 is similar to Step 120.

In the exemplary embodiment, the EAA server 210 receives 310 additional information about the event from a third-party, such as third-party server 225 (shown in FIG. 2) or one or more sensors 205 (shown in FIG. 2). The EAA server 210 analyzes 315 the container file and the additional information to make a first determination about the event.

Then the EAA server 210 receives 320 a second determination about the event from a third party, such as the third-party server 225. The EAA server 210 compares 325 the first determination and the second determination. Then the EAA server 210 generates a third determination based on the comparison.

For example, the third-party may be a different insurance provider and may generate a different determination (second) about the event based on the information that the different insurance provider had about the event. The EAA server 210 compares the two determinations to generate a third determination. This third determination may be a compromise between the two insurance providers about who should pay what for the claims associated with the event. The process 300 may include additional, less, or alternate actions, including those discussed elsewhere herein.

Exemplary Client Device

Figure 4:
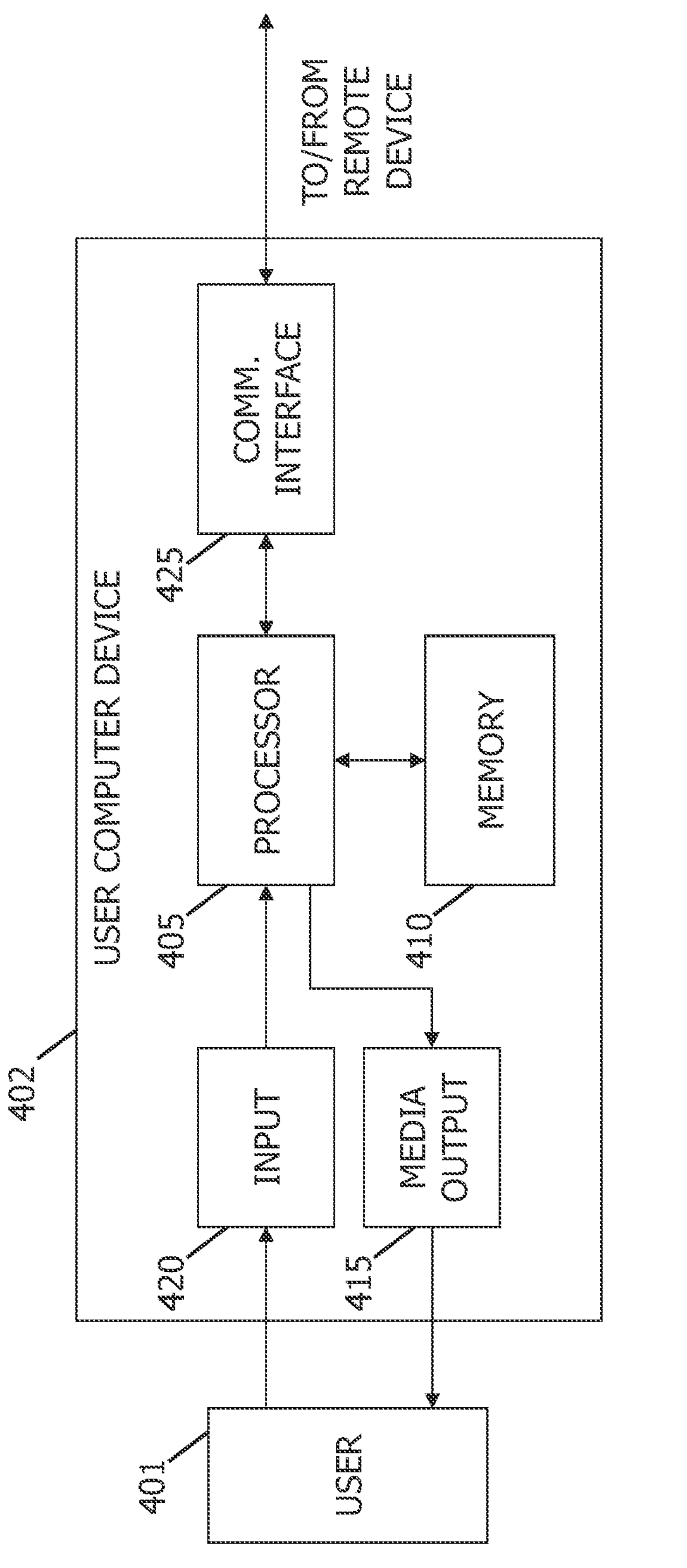
FIG. 4 illustrates an exemplary configuration of a client computer device shown in FIG. 2, in accordance with one embodiment of the present disclosure.

FIG. 4 depicts an exemplary configuration of a client computer device 235 shown in FIG. 2, in accordance with one embodiment of the present disclosure. User computer device 402 may be operated by a user 401. User computer device 402 may include, but is not limited to, sensors 205 and client computer devices 235 (both shown in FIG. 2). User computer device 402 may include a processor 405 for executing instructions. In some embodiments, executable instructions are stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (eXtended Reality) headsets).

In some embodiments, media output component 415 may be configured to present a graphical user interface (e.g., a web browser and/or a client application) to user 401. A graphical user interface may include, for example, an interface for displaying information from a container file. In some embodiments, user computer device 402 may include an input device 420 for receiving input from user 401. User 401 may use input device 420 to, without limitation, select and/or enter information for the container file.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as the EAA server 210 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from the EAA server 210. A client application allows user 401 to interact with, for example, the EAA server 210. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed.

Exemplary Server Device

Figure 5:
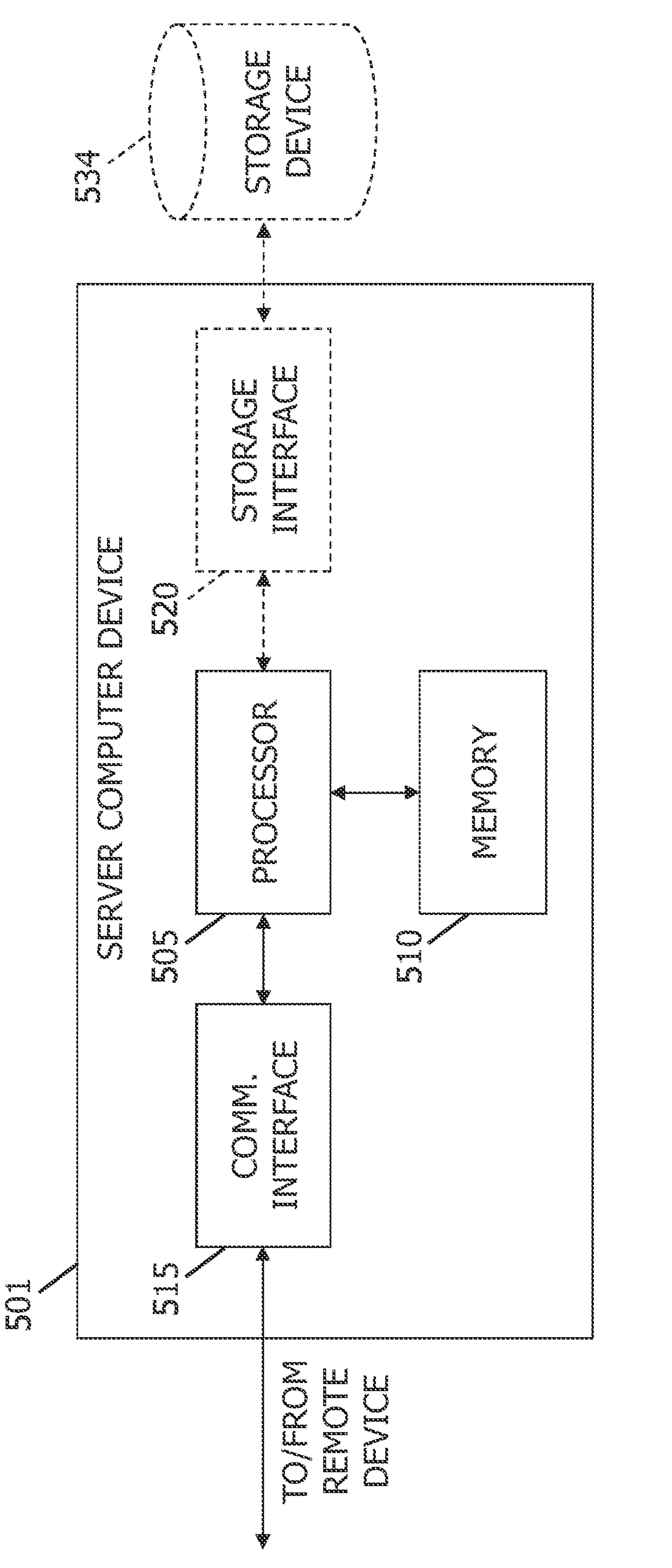
FIG. 5 illustrates an exemplary configuration of a server shown in FIG. 2, in accordance with one embodiment of the present disclosure.

FIG. 5 depicts an exemplary configuration of a server 210 shown in FIG. 2, in accordance with one embodiment of the present disclosure. Server computer device 501 may include, but is not limited to, database server 215, EAA server 210, and third-party server 225 (all shown in FIG. 2). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, sensors 205, or client computer devices 235 (shown in FIG. 2). For example, communication interface 515 may receive requests from client computer devices 235 via the Internet, as illustrated in FIG. 2.

Processor 505 may also be operatively coupled to a storage device 534. Storage device 534 may be any computer-operated hardware suitable for storing and/or retrieving data, such as, but not limited to, data associated with database 220 or third-party database 230 (shown in FIG. 2). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instructions such as illustrated in FIGS. 1 and 3.

Exemplary Forever Digital Archive

Figure 6:
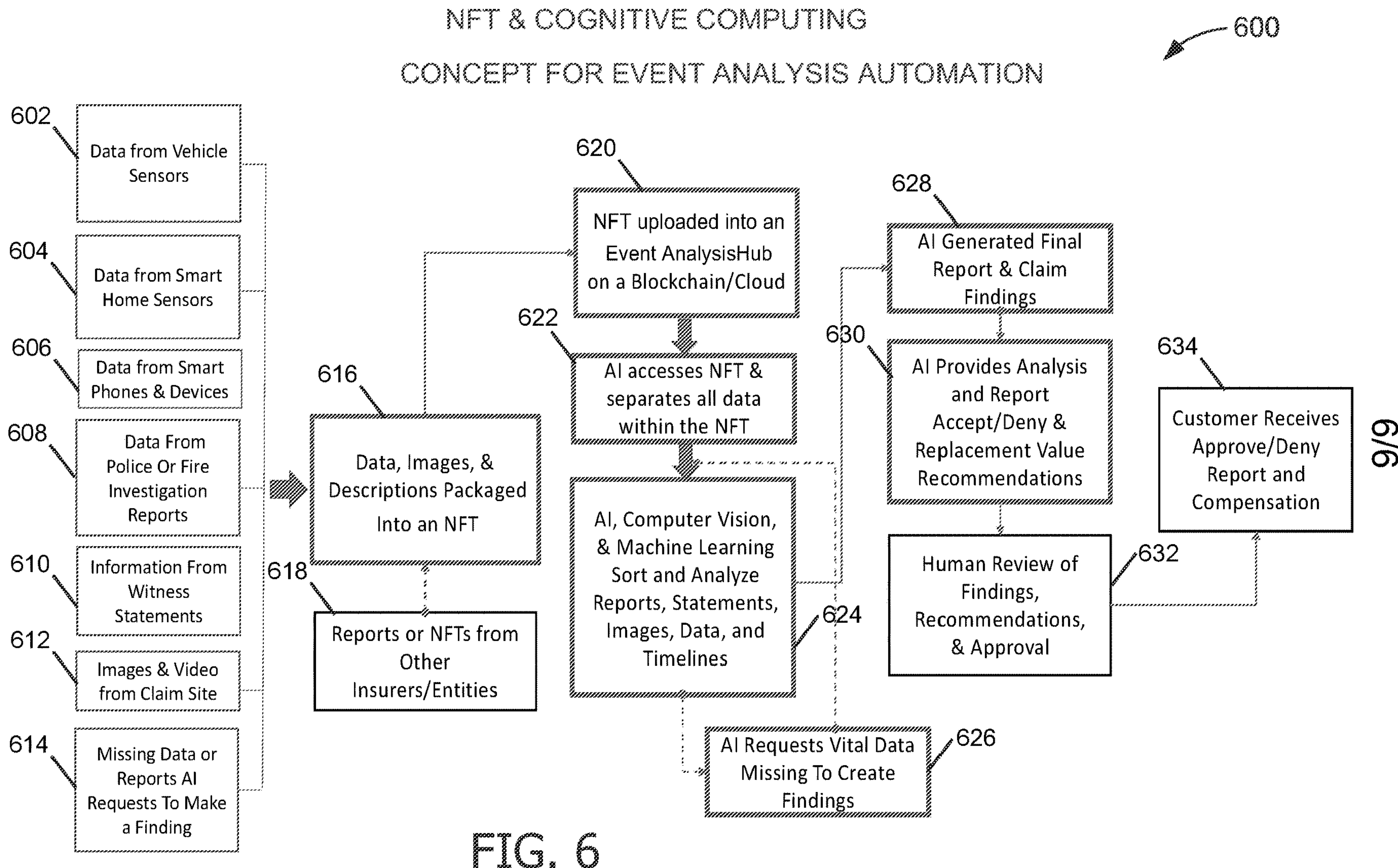
FIG. 6 illustrates a diagram of a system for event archive and analysis that may be used with the processes shown in FIGS. 1 and 3.

FIG. 6 illustrates a diagram of a system 600 for event archive and analysis that may be used with the processes shown in FIGS. 1 and 3. In some embodiments, the event is associated with an insurance claim. In the exemplary embodiment, system 600 is similar to the EAA system 200 (shown in FIG. 2).

The system 600 collects information about an event. The system 600 collects data from vehicle sensors 602, data from smart home sensors 604, data from smart phones and devices 606, data from police or fire investigation reports 608, information from witness statements 610, images and video 612 (such as from the claim site), and missing data or reports of AI requests to make a finding 614.

The system 600 also receives reports or NFTS from other insurers/entities 616, such as through third-party servers 225 (shown in FIG. 2). The system 600 combines 618 the data, images, and descriptions into an NFT. In the exemplary embodiment, the system 600 generates a container file for the data, images, and descriptions. Then the system 600 stores a link to the container file in the NFT. The system 600 also stores a hash of the container file in the NFT as well. The NFT and the container file are stored 620 in an event analysis hub, where the NFT is stored on a blockchain, and the container file is stored in the Cloud.

The system 600 has an AI access 622 the NFT to retrieve the event information. In the exemplary embodiment, the system 600 retrieves the location of the container file and the hash of the container file from the blockchain. The system 600 then retrieves the container file and then validates the container file with the hash. The system 600 then retrieves the data from the container file.

The system 600 uses 624 AI, computer vision, machine learning, and/or modeling to sort and analyze the images, statements, reports, timelines, and other data related to the event. In some embodiments, the system 600 determines that vital information is missing and the system 600 requests 626 the missing information. In some of these embodiments, the system 600 attempts to recreate the missing information from the provided information. If the system 600 is unable to recreate the data, the system 600 requests the data.

The system 600 generates 628 a final report and/or claim findings based on the analysis of the information in the NFT. In one example, the system 600 determines 630 whether or not to accept or deny the claim based on the analysis of the event. The system 600 may also determine replacement values in the claim and to make recommendations. In some further embodiments, the system 600 provides 632 the analysis and determination for review approvals generated by the system 600. Based on the individual's feedback and the analysis of the system 600, the customer may then receive 634 an approve/deny report and/or compensation for their claim.

Exemplary Embodiments & Functionality

In one embodiment, a computer system for archiving and analyzing events may be provided. The computer system may (i) receive a plurality of data for an event; (ii) generate a container file for the event to include the plurality of data; (iii) generate a non-fungible token (NFT) for the event; and/or (iv) store the NFT and the container file of the event. The computer system may store a link to a storage location of the container file in the NFT.

In some enhancements, the computer system may generate a hash of the container file. The computer system may store the hash of the container file in the NFT. The computer system may receive additional data for the container file. The computer system may also update the container file with the additional data. The computer system may further generate an updated hash for the updated container file. In addition, the computer system stores the updated hash in the NFT. The computer system also stores the updated container file as a new file. The computer system may link the NFT to the new file.

In some further enhancements, the computer system is further programmed to retrieve the container file based on the NFT. The computer system may also generate a validation hash of the container file. The computer system further validates the container file based on the validation hash matching the hash stored in the NFT.

In some additional enhancements, the computer system retrieves the plurality of data from the container file. The computer system may also analyze the plurality of data to generate a determination. The computer system further receives a claim associated with the event. In addition, the computer system determines whether to approve or deny the claim based on the analysis of the plurality of data of the event. Moreover, the computer system transmits the determination to a client computer device for approval.

In some other enhancements, the computer system may receive the plurality of data from a plurality of sensors. In some further enhancements, the computer system receives at least one of police investigation reports, fire investigation reports, witness statements, images, and/or video.

In some enhancements, the computer system receives additional data from a third-party server. The computer system stores the additional data in the container file.

In additional enhancements, the computer system may analyze the container file to make a first determination about the event. The computer system may also receive a second determination about the event from a third-party server. The computer system further may generate a third determination about the event based on a comparison of the first determination and the second determination.

In further enhancements, the computer system may analyze the plurality of data in the container file to determine if there is any missing data. The computer system may also transmit a request for the missing data. The computer system further may attempt to recreate the missing data from the plurality of data.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal belonging and/or home feature information for customers from mobile device sensors, vehicle-mounted sensors, home-mounted sensors, and/or other sensor data, vehicle or home telematics data, image data, and/or other data.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an exemplary embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer system for archiving and analyzing events based upon sensor data, the computer system including at least one processor in communication with at least one memory device and with one or more sensors, the at least one processor programmed to:

collect sensor data generated by the one or more sensors;

identify, based upon the collected sensor data, (i) a period of time during which an event occurred, and (ii) an object associated with the event;

identify, from the collected sensor data, a plurality of data associated with the event, the plurality of data generated during the identified period of time;

identify one or more entities associated with the object;

generate a container file for the event to include the plurality of data identified as being associated with the event;

generate a non-fungible token (NFT) for the event, the NFT defining ownership that enables access to the container file to the one or more entities associated with the object; and store the NFT and the container file of the event.

2. The computer system of claim 1, wherein the at least one processor is further programmed to store a link to a storage location of the container file in the NFT.

3. The computer system of claim 1, where the at least one processor is further programmed to:

generate a hash of the container file; and store the hash of the container file in the NFT.

4. The computer system of claim 3, wherein the at least one processor is further programmed to:

receive additional data for the container file;

update the container file with the additional data;

generate an updated hash for the updated container file; and store the updated hash in the NFT.

5. The computer system of claim 4, wherein the at least one processor is further programmed to:

store the updated container file as a new file; and link the NFT to the new file.

6. The computer system of claim 3, wherein the at least one processor is further programmed to:

retrieve the container file based on the NFT;

generate a validation hash of the container file; and validate the container file based on the validation hash matching the hash stored in the NFT.

7. The computer system of claim 1, wherein the at least one processor is further programmed to:

retrieve the plurality of data from the container file; and analyze the plurality of data to generate a determination.

8. The computer system of claim 7, wherein the at least one processor is further programmed to:

receive a claim associated with the event; and determine whether to approve or deny the claim based on the analysis of the plurality of data of the event.

9. The computer system of claim 7, wherein the at least one processor is further programmed to transmit the determination to a client computer device for approval.

10. The computer system of claim 1, wherein the at least one processor is further programmed to receive at least one of police investigation reports, fire investigation reports, witness statements, images, and/or video.

11. The computer system of claim 1, wherein the at least one processor is further programmed to:

receive additional data from a third-party server; and store the additional data in the container file.

12. The computer system of claim 1, wherein the at least one processor is further programmed to:

analyze the container file to make a first determination about the event;

receive a second determination about the event from a third-party server; and generate a third determination about the event based on a comparison of the first determination and the second determination.

13. The computer system of claim 1, wherein the at least one processor is further programmed to:

analyze the plurality of data in the container file to determine if there is any missing data; and transmit a request for the missing data.

14. The computer system of claim 13, wherein the at least one processor is further programmed to attempt to recreate the missing data from the plurality of data.

15. A computer-based method for archiving and analyzing events based upon sensor data, the method being implemented on an Event Archive and Analysis ("EAA") server that includes at least one processor in communication with at least one memory device and with one or more sensors, the method comprising, via the at least one processor:

collecting sensor data generated by the one or more sensors;

identifying, based upon the collected sensor data, (i) a period of time during which an event occurred, and (ii) an object associated with the event;

identifying, from the collected sensor data a plurality of data associated with the event, the plurality of data generated during the identified period of time;

identifying one or more entities associated with the object;

generating a container file for the event to include the plurality of data identified as being associated with the event;

generating a non-fungible token (NFT) for the event, the NFT defining ownership that enables access to the container file to the one or more entities associated with the object; and storing the NFT and the container file of the event.

16. The computer-based method of claim 15 further comprising storing a link to a storage location of the container file in the NFT.

17. The computer-based method of claim 15 further comprising:

generating a hash of the container file; and storing the hash of the container file in the NFT.

18. The computer-based method of claim 17 further comprising:

receiving additional data for the container file;

updating the container file with the additional data;

generating an updated hash for the updated container file; and storing the updated hash in the NFT.

19. At least one non-transitory computer-readable media having computer-executable instructions embodied thereon for archiving and analyzing events based upon sensor data, wherein when executed by a computing device including at least one processor in communication with at least one memory device and with one or more sensors, the computer-executable instructions cause the at least one processor to:

collect sensor data generated by the one or more sensors;

identify, based upon the collected sensor data, (i) a period of time during which an event occurred, and (ii) an object associated with the event;

identify, from the collected sensor data a plurality of data associated with the event, the plurality of data generated during the identified period of time;

identify one or more entities associated with the object;

generate a container file for the event to include the plurality of data identified as being associated with the event;

generate a non-fungible token (NFT) for the event, the NFT defining ownership that enables access to the container file to the one or more entities associated with the object; and store the NFT and the container file of the event.

* * * * *